US006789018B1

(12) United States Patent
Khan

(10) Patent No.: US 6,789,018 B1
(45) Date of Patent: Sep. 7, 2004

(54) MAPPING RESERVOIR ROCKS USING FREQUENCY SPECTRAL BROADENING AND THE PRESENCE OF THE SLOW-WAVE

(75) Inventor: Tawassul A. Khan, Houston, TX (US)

(73) Assignee: Nonlinear Seismic Imaging, Inc., Cypress, TX (US)

( * ) Notice: Subject to any disclaimer, the term of this patent is extended or adjusted under 35 U.S.C. 154(b) by 0 days.

(21) Appl. No.: 10/651,068

(22) Filed: Aug. 29, 2003

(51) Int. Cl.[7] .............................................. G01V 1/28
(52) U.S. Cl. ........................................... 702/2; 703/10
(58) Field of Search .............................. 702/2, 16, 17; 221/68

(56) References Cited

U.S. PATENT DOCUMENTS

| | | | | |
|---|---|---|---|---|
| 3,128,011 A | * | 4/1964 | Bleiman ...................... 221/68 |
| 5,349,527 A | * | 9/1994 | Pieprzak et al. .............. 702/17 |
| 6,055,482 A | * | 4/2000 | Sudhakar et al. ............. 702/16 |
| 6,131,071 A | * | 10/2000 | Partyka et al. ................ 702/16 |
| 6,175,536 B1 | | 1/2001 | Khan .......................... 367/32 |

OTHER PUBLICATIONS

John P. Castagna et al., Instantaneous spectral analysis: Detection of low–frequency shadows associated with hydrocarbons, Feb. 2003, pp. 120–128, The Leading Edge.
M.A. Biot, Theory of Propagation of Elastic Waves in a Fluid–Saturated Porous Solid. Journal of the Acoustical Society of America, Mar. 1956, pp. 168–191, vol. 28, No. 2.
A.E. Scheidegger, The Physics of Flow Through Porous Media, 1960, The MacMillan Company, New York.
Theodorous Klimentos and Clive McCann, Why is the Biot slow compressional wave not observed in real rocks? Geophysics, Dec. 1988, pp. 1605–1609, vol. 53, No. 12.
Donskoy, Khashanah and McKee, Nonlinear acoustic waves in porous media in the context of Biot's theory, Jnl of the Acoustical Society of America, Nov. 1997, pp. 2521–2528, 102.

Johnson et al., Manifestation of nonlinear elasticity in rock: convincing evidence over large frequency and strain intervals from studies, Journal of Nonlinear. Processes in Geophysics, pp. 1–12, MS 95023.

Paul Johnson et al, Nonlinear Generation of Elastic Waves in Crystalline Rock , Journal of Geophysical Research, Apr. 10, 1987, 3597–3802, vol. 92, No. B5.

Meegan, Johnson et al, Observations of nonlinear elastic wave behavior in sandstone, Jnl. of Acoustical Society of America, Dec. 1993, pp. 3387–3391, vol. 94, No. 6.

Johnson and McCall, Observation and implications of non-linear elastic wave response in rock, Geophysical Research Letters, Feb. 1, 1994, pp. 165–169, vol. 21, No. 3.

Geladi M. Goloshubin et al., Selsmic low–frequency effects from oil–saturated reservoir zones, SEG 2002, The Leading Edge.

* cited by examiner

Primary Examiner—Kamini Shah
Assistant Examiner—Victor J Taylor
(74) Attorney, Agent, or Firm—Nonlinear Seismic Imaging, Inc.; Tawassul A. Khan; Sofia Khan McGuire

(57) ABSTRACT

Elastic nonlinear effects, which cause frequency spectral broadening and the effects of the presence of the Slow-Wave in the reservoir rocks, are investigated. The creation of new frequencies due to elastic nonlinearity of the reservoir rocks and their presence in the reflected seismic signals is used to map the location and extent of the reservoir formations. The large differences in the velocities of the Compressional Wave and the Slow-Wave cause changes in their reflection and refraction characteristics. The reflection due to Slow-Wave appears as a low-frequency artifact, delayed in time. The delay time of this artifact is used to calculate the Slow-Wave velocity and the tortuosity of the reservoir rocks. Based on the tortuosity and the wellbore data, permeability can be estimated.

2 Claims, 5 Drawing Sheets

MAPPING RESERVOIR ROCKS USING FREQUENCY SPECTRAL BROADENING AND THE PRESENCE OF THE SLOW-WAVE

BACKGROUND OF INVENTION

1. Field of Invention

The present invention relates to mapping the presence and the location of the subsurface hydrocarbon reservoirs using the changes in the spectral and amplitude characteristics of the seismic pulse, due to elastic nonlinearity as the seismic pulse propagates through the porous and permeable reservoir rocks. The seismic wave or seismic pulse goes through a nonlinear transformation, and its spectral and amplitude characteristics change. Spectral broadening of the seismic pulse takes place as it is reflected, refracted, and transmitted through the porous reservoir rocks. Due to the elastic nonlinearity effects of the reservoir rocks new frequencies are generated. The generation of the new frequencies and their presence in the reflected signals is used to map the porous and permeable reservoir rocks. Reservoir rocks, which are highly permeable, also generate a Slow-Wave. The Slow-Wave travels at a much lower velocity than the Compressional Wave. The presence of the Slow-Wave also affects the amplitude and the spectrum of the reflected signals. The changes in the spectrum of the seismic reflected signals are used as an indicator to detect the presence of reservoir rocks and measure the reservoir rock properties. This invention would be extremely useful in detecting stratigrapic hydrocarbon traps that are difficult to map using structural information.

2. Description of the Prior Art

The current state-of-the-art seismic technologies that are being used to map the reservoir characteristics include 3-D seismic reflection surveys, seismic attribute analysis, signal amplitude extraction, and coherency techniques. In spite of all the recent progress in seismic data acquisition and seismic data processing, results are quite often non-unique and ambiguous and fail to identify the higher porosity and fractured zones that contain a significant portion of the hydrocarbon reserves.

New technologies and more sensitive methods of measuring the reservoir characteristics are to be developed and introduced to identify and map the higher porosity and fractured reservoir rocks, which may contain a large portion of the unproduced hydrocarbon reserves. In the past, the seismic industry has ignored the effects of elastic dynamic nonlinearity of the reservoir rocks. The measurement of the dynamic elastic nonlinearity of the reservoir rocks is a sensitive tool because the porosity induces an orders of magnitude change for the nonlinear coefficients and a few percent change for linear parameters of velocity, attenuation etc. [Reference: Donskoy, McKee, 1977; Paul Johnson, 1997].

The current seismic reflection methods use the response of the earth's subsurface formations to the seismic waves for mapping the structural geology of the hydrocarbon reservoirs. For seismic reflection recording, the seismic source generates a seismic impulse, which propagates through the earth and the reflection response of the subsurface is recorded. The reflected signal characteristics depend on the acoustic and elastic properties of the rock formations. When the seismic wave encounters abrupt changes in the acoustic properties of the subsurface formations, it is reflected and refracted as it travels through the earth. The seismic measurements of the travel times and the amplitudes of the reflected signals define the subsurface geometry and provide an estimate of the acoustic impedances related to the subsurface rock velocities and densities. The seismic reflection record is basically the result of the convolution of the source-generated seismic pulse with the reflection coefficient series of the subsurface rock formations. The amplitude and the phase of the reflected and refracted signals are related to the elastic properties of different elastic mediums. During the downward propagation, there is a loss of higher frequencies, and the amplitude frequency response shows narrowing of the spectrum with depth, where the high frequency limit is imposed by the attenuation of the earth. Earth filtering effects are a major weakness of the current seismic methods.

The current seismic practice make two incorrect assumption when dealing with seismic wave propagation. First, they generally ignore the effects of elastic nonlinearity and treat sedimentary rocks as elastically linear. This is quite often to avoid extremely complex and cumbersome mathematics necessary when dealing with nonlinear behavior. Implicit in the assumption of linearity is the fact that the seismic wave or pulse recorded after being reflected and refracted can contain only those frequencies present in the input signal—the original seismic pulse that was initially transmitted. In the assumption of an elastically linear system no new frequencies can be generated.

The second incorrect assumption made is that the contribution of the Slow-Wave in the reflected and refracted signals from a porous and permeable rock formation is negligible and can be ignored. In reality, the reflected and refracted signals from a porous and permeable rock formation have two components. Part of the propagating energy is reflected and refracted from the rock matrix and part of the energy is reflected and refracted from the pore fluids that are contained in the rock formation. The compressional energy in the permeable rocks, which travels through the pore fluids, is known as a Slow-Wave. Due to the presence of this Slow-Wave in the permeable rock formation, the character and the amplitude of the reflected and refracted signals is affected and changed. The measurement of these changes provides us with a new seismic attribute that can be used to map the reservoir rock properties.

The current seismic methods assume that the earth is elastically linear, and the seismic wave or seismic pulse, as it travels through the earth subsurface formations, experiences no interaction between the frequencies generated by the seismic source. It is assumed that all the changes in the frequency spectra are caused due to attenuation, dispersion, and the reflection tuning effects. With the current assumptions of the earth being an elastically linear system, the recording equipment is designed and configured to handle the band limited seismic signals. Most seismic recordings for hydrocarbon exploration are made with a bandwidth of 6 to 8 Hz on the lower end of the seismic frequency spectrum and 70 to 80 Hz on the upper end of the frequency spectrum. The current recording practices are designed for a linear earth model. This limited frequency bandwidth is not adequate for recording the elastically nonlinear effects of the reservoir rocks. Elastic nonlinearity effects in a porous and permeable reservoir rock generate harmonics and sum-and-difference frequencies. These newly generated frequencies have to be preserved and recorded so that their presence can be detected and measured for mapping the porosity and permeability of the reservoir. To achieve that, seismic data has to be recorded with a bandwidth that has lower frequencies all the way down 0 Hz and higher frequencies to at least twice the frequency that is being currently used.

The current seismic bandwidth limitations are imposed by the recording characteristics of the receivers, amplifiers, and digitizers. These recording frequency bandwidth limitations are accepted because of the current assumption that the earth behaves linearly to the seismic signal. Higher frequencies are limited by the source generated signal and the earth's attenuation. The limit on the lower frequency is quite often determined by the seismic source and the response of the receivers. However, if the earth model is modified to an elastically nonlinear system, then one will expect lower frequencies down to Zero Frequency signals being generated at the lower frequency end of the spectrum and the harmonics of the highest usable frequency being generated in the elastically nonlinear earth. At present, the recording equipment and the knowledge of using that equipment exists in the industry to modify the current systems, for accommodating the recording requirements of this invention. For this invention, the seismic data are recorded, with a broad frequency bandwidth that covers from Zero Frequency to a few hundred Hz.

In the past, geoscientists have noticed certain anomalies in the processed results of the seismic data, which are associated with the presence of hydrocarbons in the reservoirs. However, there is uncertainty and ambiguity in their interpretation because the anomalous behavior of the seismic results is neither well understood nor easily explained. As an example, low-frequency 'shadows' have been associated with thin gas sands in Gulf of Mexico seismic data, without fully understanding what causes these shadows. These low-frequency shadows are sometimes not present when the gas sand is thicker. Also these shadows are stronger than the reservoir reflection and suggest that some unknown process not fully understood has generated these lower frequencies. The conventional linear earth models are unable to adequately explain this phenomenon.

The second example is the presence of very low frequency reflections, which are associated with the presence of oil. Such reflections have been recorded in the Soviet Union by Goloshubin et al. The explanations that have been given to justify their presence do not fit the realistic seismic wave behavior in the subsurface formations. This invention explains the cause of generating these anomalies. Once the mechanism, which generates these shadows and low-frequency reflections, is correctly understood, the geoscientist will be able to better utilize the seismic data for Direct Hydrocarbon Detection.

SUMMARY OF INVENTION

1) This Patent explains the spectral broadening of the seismic frequency spectrum due to elastic nonlinearity of the reservoir rocks. New lower and higher frequencies are created, which were not originally present in the input seismic pulse. Mapping these new frequencies, which are generated not by the source but by the reservoir rocks, provides a new method of mapping reservoir formations saturated with hydrocarbons.
2) The Patent further explains the generation of Slow-Wave in the permeable reservoir rock and its effect on the reflections and refractions from the upper and lower interface of the reservoir formation.
3) This invention shows that the generation of the Slow-Wave causes its reflection from the lower interface of the reservoir formation to be delayed and appear on the seismic reflection display as a 'shadow' or 'ghost', which appears below the reservoir reflection event.
4) For the first time in the seismic industry, this Patent introduces a method of direct hydrocarbon detection that uses the frequency spectral broadening of the seismic pulse due to nonlinearity and the effects of Slow-Wave on the reflected and refracted seismic signal from the reservoir formations.

This invention provides a new method of mapping hydrocarbon reservoir formations that are porous and permeable. A conventional seismic impulse source is used to acquire the seismic reflection data. There is a major difference in this method from conventional seismic data acquisition currently being used. The difference is the requirement of recording seismic data using a wider frequency bandwidth of the seismic signals, compared to the normal practice in use today. To achieve the required broader frequency bandwidth, the seismic data are recorded using seismic receivers and recording instruments capable of preserving the signal frequency bandwidth from Zero Frequency to at least twice the usable high frequency expected for standard recording. Most of the seismic reflection signals for the current seismic hydrocarbon exploration are band limited at the higher part of the frequency spectrum to frequencies that are lower than 120 Hz. This high frequency limitation is accepted due to earth filtering and absorption effects, which severely attenuate the higher frequencies as the signal propagates downwards towards the deeper section of the earth. This invention requires extended bandwidth of up to 240 Hz so that the second harmonic of the highest usable frequency can be recorded. The newly created frequencies are not generated by the source, but are created in the subsurface reservoir rocks. At present, the necessary equipment and knowledge exists in the industry to record seismic data that will provide the extended bandwidth required for this invention.

This invention corrects the two incorrect assumptions accepted by the seismic industry when dealing with the seismic reflection mapping of the subsurface formations. The first incorrect assumption is that the earth is linear and that no new frequencies, not present in the source-generated signal, can be generated by the elastic nonlinearity of the earth. The second incorrect assumption is that the contribution of the Slow-Wave generated in the porous and permeable reservoir rocks can be ignored when dealing with the reflected and refracted seismic signals from a reservoir formation. This invention shows the significance of the spectral broadening due to the elastic nonlinearity of the porous formations, and the defines the contribution of the Slow-Wave generated in the reservoir in the reflected and refracted signals.

Two compressional waves, as they propagate through a porous rock that acts as an elastically nonlinear medium, interact with each other. Due to this interaction, the sum and difference frequencies of the two primary waves are created. These new frequencies constitute an 'interaction' wave that travels along with the primary waves. The amplitude of the summed frequencies or the 'interaction' wave is a function of the amplitudes of the two primary waves and the propagation distance though the nonlinear rock. Its amplitude grows with propagation distance due to nonlinearity but also decays with propagation distance due to earth's attenuation. Reference U.S. Pat. No. 6,175,536 (Khan), where the interaction of the two crosswell seismic signals was successfully recorded as they propagate through the nonlinear reservoir formations.

In the case of a discrete frequency transmission through elastically nonlinear rock, the second harmonic is generated as a result of addition with itself, and Zero Frequency is generated as a result of differencing with itself. In the case of a seismic pulse, which is composed of many discrete frequencies, harmonics and sum and difference frequencies of all the discrete frequencies are generated. This results in the broadening of the frequency spectrum and creation of new frequencies, which were not present in the original pulse. The measurement of these new frequencies enables us to map the elastically nonlinear characteristics of the earth formations.

Biot (1956) proposed a comprehensive theory that explained many important features of the seismic wave propagation in fluid-saturated porous media. One of the important contributions of his theory is the prediction of a Slow Compressional Wave with a speed lower than that of the rock matrix or the pore fluid. The Slow-Wave involves a coupled motion between the fluid and the solid frame. The Slow-Wave's velocity and attenuation depend on the morphology of the pore space and the pore interconnections, which also determine the fluid transport properties such as permeability.

When a pressure wave travels through a rock, the rock matrix and pore fluids are simultaneously compressed. The velocity of the Compressional Wave in the rock matrix is related to the mineral frame and the cementation between the grains, while the velocity of the slower component of the Compressional Wave that travels through the interconnected fluid path is determined by the physical properties of the pore fluids and the tortuosity of the connected pores in the rock. In the current seismic reflection recording and processing methods, the seismic industry has ignored the contribution of the Slow-Wave when dealing with the reflected and refracted seismic signals from a porous and permeable reservoir formation.

This invention deals with the effects of spectral broadening due to elastic nonlinearity and the effects of the Slow-Wave on the reflected and refracted seismic signals and how these nonlinear effects can be measured and used to map the reservoir rocks.

Spectral Broadening Due to Nonlinearity

The spectrum of the seismic-reflected signal is derived from the initial characteristics of the source input pulse. The composite spectrum of the seismic signal may deviate from the input spectrum due to higher frequency attenuation as the seismic wave propagates through different subsurface formations. During the propagation of the seismic wave in the reservoir rocks, a certain amount of spectral broadening takes place. This spectral broadening is caused by the elastic nonlinearity of the reservoir rocks. The initial source-generated pulse is composed of multiple discrete frequencies. These multiple discrete frequencies generate their harmonics and additional sum and difference frequencies are created due to the nonlinear interaction between each other. This nonlinear interaction as the seismic wave travels through the reservoir formations creates new frequencies not originally present in the initial pulse. The amplitude of the harmonics and the sum and difference frequency components that create the broadening of the frequency spectrum, grows with the distance due to nonlinearity. However, the higher frequencies component of the new spectrum experiences a certain amount of decay due to the earth's attenuation. The presence of these newly created frequencies in a seismic reflection representing a subsurface reservoir formation is an indicator that the particular formation is porous and permeable.

In spite of the limitations due to the band-limited nature of the seismic signals, the subtle changes in the wave shape or frequency spectrum can be used to interpret the subsurface stratigraphic details. Every seismic wave shape has a geologic significance, which only needs a definition. Changes in the spectral and amplitude characteristics of the seismic signal are associated with the porous and fluid-saturated rocks. This Patent establishes a physical link between the porosity and permeability of the reservoir rocks with the broadening of the frequency spectrum of the initial seismic pulse.

The frequency spectral broadening is a powerful seismic attribute to predict and map the hydrocarbon reservoir rocks that are of economic interest to the oil industry. Although geoscientists currently use seismic attributes to infer reservoir properties, the seismic nonlinear attributes have been ignored. The spectral broadening of the reflected signals from the top and bottom interface of the reservoir rocks is a powerful indicator of its rock properties.

There are a lot of different methods of frequency filtering and estimating spectral bandwidth of the seismic time varying signals, which are being used in the industry. There are conventional methods that use Fast Fourier Transform (FFT) for spectral estimation. For certain applications FFT is limited in its resolving power since it requires a fairly long spectral window. Discrete Fourier Transform (DFT) is preferred at times, since DFT offers greater speed and does not require similar transform length, as does FFT. Other time-frequency domain spectral analysis techniques have been developed, which can be used for spectral attribute extraction and are useful for estimating instantaneous frequency. The strength of this Patent is that it is not sensitive to different methods of spectral decomposition and filtering. For general applications, conventional Low-Pass and High-Pass filtering methods can be effectively used to identify and map the reservoir formations of interest.

To get full advantage of the method described in this Patent, seismic data should be recorded with broader frequency bandwidth than currently being used. It is important to record lower frequencies all the way down to Zero Frequency since lower frequencies survive earth attenuation better than higher frequencies. For recording higher frequencies the upper frequency bandwidth limitation should be high enough to record the second harmonic of the highest usable frequency in the reflected signal from the reservoir formation. Since the spectral broadening is taking place in the earth at the reservoir level, the spectral characteristics of the reflected signal do not go through the same attenuation process as the initial source generated pulse. For this Patent, the seismic data processing sequence is the same as for conventional data. The broadband frequency content and the true relative amplitudes are preserved. To get the desired seismic reflection image, the data are stacked, migrated, and displayed as a 2-D or 3-D volume. High-and low-cut frequency filters, which are designed to accommodate the source-generated input pulse, are used for standard display. In addition to the conventional display, two additional displays are generated. One is generated using a Low-Pass filter, which only allows the lower frequencies that were not present in the input pulse but were generated as a result of spectral broadening due to the elastic nonlinearity effects of the reservoir rocks. The second is generated using a High-Pass filter, which removes all the frequencies that represent the conventional reflection from the reservoir formation.

The two filtered displays of the 2-D or 3-D seismic reflection volume, which result from spectral broadening due to elastic nonlinearity, will highlight the nonlinear formations of the subsurface. Since there is a strong correlation between nonlinearity and reservoir porosity and permeability, the two high-and low-frequency displays will map the reservoir location and its extent.

The Effects of the Slow-Wave On Reservoir Reflection

When a pressure wave travels through a rock, the rock matrix and pore fluids are simultaneously compressed. The velocity of the Compressional Wave in the rock matrix is related to the mineral frame and the cementation between the grains, while the velocity of the slower component of the Compressional Wave that travels through the interconnected fluid path is determined by the physical properties of the pore fluids and the tortuosity of the connected pores in the rock.

In the published literature, the Compressional Wave that travels through the fluids in the interconnected pores is identified as Slow-Wave. Slow-Wave has been measured under laboratory conditions in samples of glass beads and different porous and permeable sandstones. The Slow-Wave travels at the fluid compressional velocity but does so over a longer distance along the tortuous interconnected pores between the two ends of the reservoir formation that is being measured.

When a seismic wave encounters an abrupt change in the elastic properties of different subsurface formations, part of the energy is reflected and part of it is refracted. The amplitude and the phase of the reflected and refracted signals are related to the elastic properties of the two subsurface formations. When one of the subsurface is porous, permeable and fluid saturated, its reflection coefficient becomes a function of the rock matrix and its pore fluids. Part of the reflected energy is reflected from the rock matrix and part of it from its fluid content. The composite reflection from a porous, permeable and fluid saturated formation is the result of the reflected energy from the rock matrix and its pore fluids. In most cases due to a large velocity difference between the faster Compressional Wave and Slow-Wave, the separate components of the reflected signal from the rock matrix and its pore fluids will be out of phase from each other. The character and the amplitude of the composite reflected signal will be modified according to the porosity and the permeability of the reservoir formation.

The faster Compressional Wave travels through the rock matrix and the Slow-Wave travels through the interconnected pores that are filled with fluid. Since there is a great deal of difference in the velocities of the Compressional Wave and the Slow-Wave, the refracted angles of the two waves become different. The two waves separate and travel through the reservoir formation on two independent paths at two different angles and at two different velocities. Two separate reflections occur at the lower interface of the reservoir formation. When the data are processed using conventional methods, an artifact, which represents the Slow-Wave reflection, occurs below the reservoir reflection, but delayed in time. At present this artifact cannot be explained and is known as a 'shadow' or 'ghost' in the industry. This Patent explains the cause of such a 'shadow' and how this information can be used to map certain reservoir properties. This Patent further uses the spectral broadening of the seismic-reflected signal for mapping the presence and location of the subsurface reservoir formations.

The amplitude and the velocity of the Slow-Wave are related to the rock tortuosity, permeability and pore fluid viscosity. The amplitude of the Slow-Wave is relatively larger in a reservoir formation, which has higher permeability and lower-viscosity pore fluids. Slow-Wave, which is created in the saturated reservoir rocks, travels at a much slower velocity compared to the Compressional Wave. The time delay of the Slow-Wave reflection from the lower interface of the reservoir formation, which appears as a 'shadow', can be used to calculate the Slow-Wave velocity. There are several other alternate methods of velocity analysis that are suitable for this application and are known and currently being used in the industry. Most of them measure, in one form or the other, the maximum coherency of the Common Depth Point (CDP) data by determining the best velocity fit for imaging the target geologic formations in depth or in time. Once the best root mean square (RMS) or migration velocity information has been derived, the interval velocities can be calculated. The alternate methods of determining Slow-Wave velocity can be used and the velocity further refined, after the presence of the 'shadow' has been established and the reservoir reflection identified. Once the velocity of the Slow-Wave has been determined, the tortuosity of the reservoir rock can be calculated. Knowing the tortuosity, the permeability of the rock can be estimated.

In summary, this Patent describes and explains the elastic nonlinear response of the porous and permeable reservoir formations to the seismic wave that propagates through it. For the first time this invention explains the anomalous behavior, which causes the presence of certain artifacts that have been noticed on the seismic reflection displays. The artifacts are directly related to the presence of hydrocarbons in the reservoir formations.

DESCRIPTION OF THE PREFERRED EMBODIMENT

Figure 1:
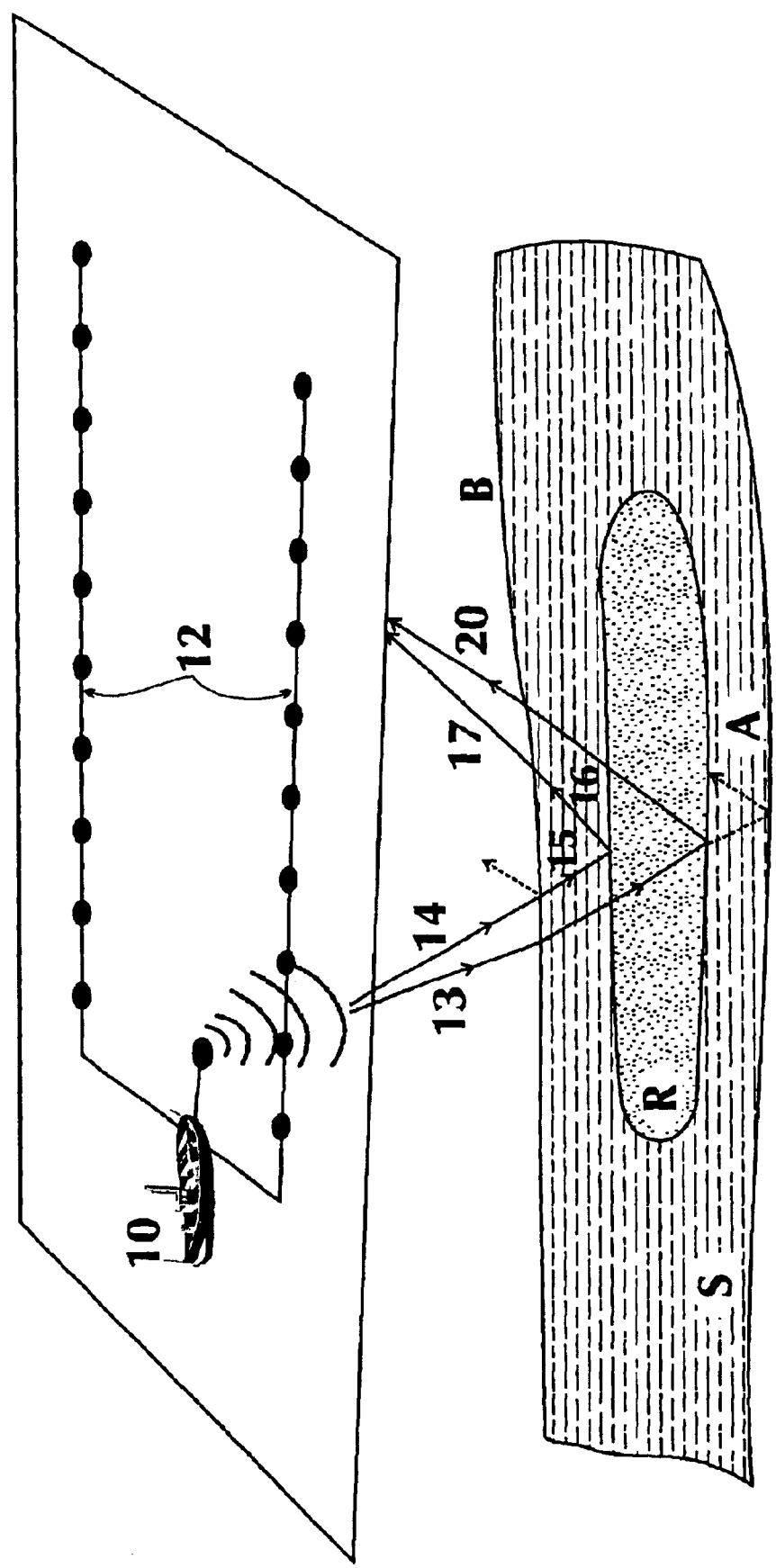
FIG. 1 is a schematic illustration of a cross-section of the earth, which illustrates the field data acquisition for this invention.

Referring to FIG. 1, a cross-section of the earth is displayed, where a marine vessel is being used to acquire seismic reflection data. The seismic source being used is an impulse-generating marine air gun. The reflection seismic data are being recorded by the marine streamers equipped with hydrophones. While this description uses a marine seismic example, the concept of this invention is equally valid for land seismic, where the seismic impulsive source could be dynamite explosive, or a land air gun, or a thumper.

In the exemplary survey of FIG. 1, 10 is shown as a marine vessel, 11 is a marine acoustic impulse source, and 12 are the hydrophone streamers. The important requirement of this invention is that data are recorded using a frequency bandwidth, which includes the lowest possible frequency, all the way down to Zero Frequency, and the highest frequency extends to the second harmonic of the highest usable frequency of the conventional recording. If the highest useable frequency for conventional recording to map a specific reservoir formation is 100 Hz, then for this invention we should record the higher frequencies up to 200 Hz. In FIG. 1, the source 11 transmits a seismic pulse that propagates down as 14 and is refracted and reflected as 15,16, and 17 from the top of the reservoir formation R. The reservoir formation R is embedded in a sealing formation S. The seismic signal 13 is refracted in the reservoir formation R as 18, and is reflected from the lower interface of R and S as 19 and recorded by the hydrophones 12 as 20. In a similar manner there will be seismic reflections from the upper and lower interfaces of the sealing formation S, shown as A and B. The frequency spectrums of the reflected and refracted seismic signals are affected by the elastic nonlinearity of the porous and permeable characteristics of the reservoir formation R. The amplitude and the frequency content of the reflected signal from the upper interface of the reservoir formation R are modified due to the reservoir pore fluid content and the resultant Slow-Wave, which is being generated. The frequency spectral broadening also takes place as the seismic wave travels through the permeable and porous reservoir formation R, as 18 and 19. As a result of spectral broadening lower and higher frequencies are created which were not originally transmitted from the source 11. To record the newly created frequencies by the earth formations, the recording characteristics of the receiver 12, digitizers and the other recording equipment located in the marine vessel 10 should be able to record from Zero Frequency to twice the frequency of the highest frequency conventionally recorded.

Figure 2:
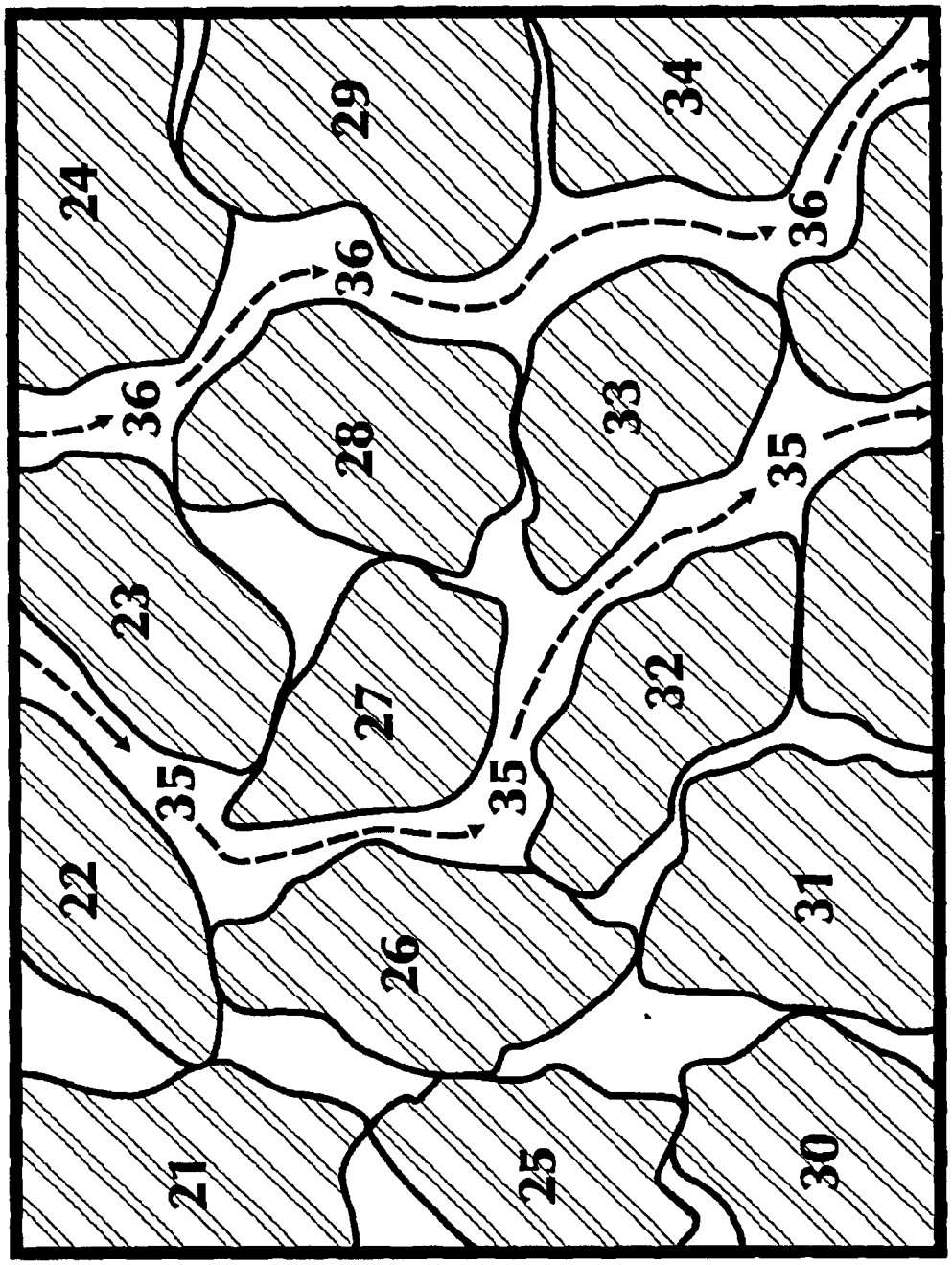
FIG. 2 is a magnified illustration of a permeable and porous rock in which fluid saturated pores are interconnected.

FIG. 2 shows a simple illustration of a porous, permeable and fluid saturated rock. It shows a disordered arrangement of mineral grains that form the rock matrix, and the pore space between them, which is fluid-saturated. The mineral grains are shown as 21, 22, 23 . . . to 34. The interconnected pores are shown as 35 and 36. Due to the porosity of reservoir formation, a certain percentage of the rock volume is made up with the mineral grains and the rest is composed of pore fluids. The elastic properties of the mineral grains are different in comparison with the pore fluids. The amplitude and the frequency spectrum of the reflected signal from the upper interface of the reservoir formation R, shown as 14, 15, 16, and 17 in FIG. 1, is a composite of the reflection from the rock matrix and its pore fluids. The velocities and the densities of the rock matrix and its pore fluids are very much different. The phase of the reflected signal is related to the acoustic impedance contrast between the formation S and R in FIG. 1. Due to the velocity contrast between the rock matrix and the pore fluids, the part of the energy reflected from the rock matrix of the reservoir formation R will be out of phase with the reflected energy from the pore fluids of R. The amplitude of the composite reflected signal 16 and 17 will be reduced and its spectrum modified. This change in the amplitude and the frequency spectrum of the reflection from the top of the reservoir is used in this invention to map the existence of the reservoir rocks in stratigraphic and other complex geologic conditions, which cannot be easily mapped using current and conventional methods.

FIG. 2 also shows 35 and 36 as interconnected pores. The pore fluids are in communication through these tortuous paths. Part of the energy of a seismic compressional wave travels through the rock matrix mineral grains, 21 to 34, in FIG. 2, and part of the energy travels through the pore fluid connections 35 and 36. Energy traveling through the pore fluids is known in the industry as Slow-Wave. The velocity of the Slow-Wave is slower than the compressional velocity of the rock matrix and also slower than the compressional velocity of the pore fluid. The velocity of the Slow-Wave is essentially the velocity of the pore fluid but through a tortuous path as shown by 35 and 36 in FIG. 2.

Figure 3:
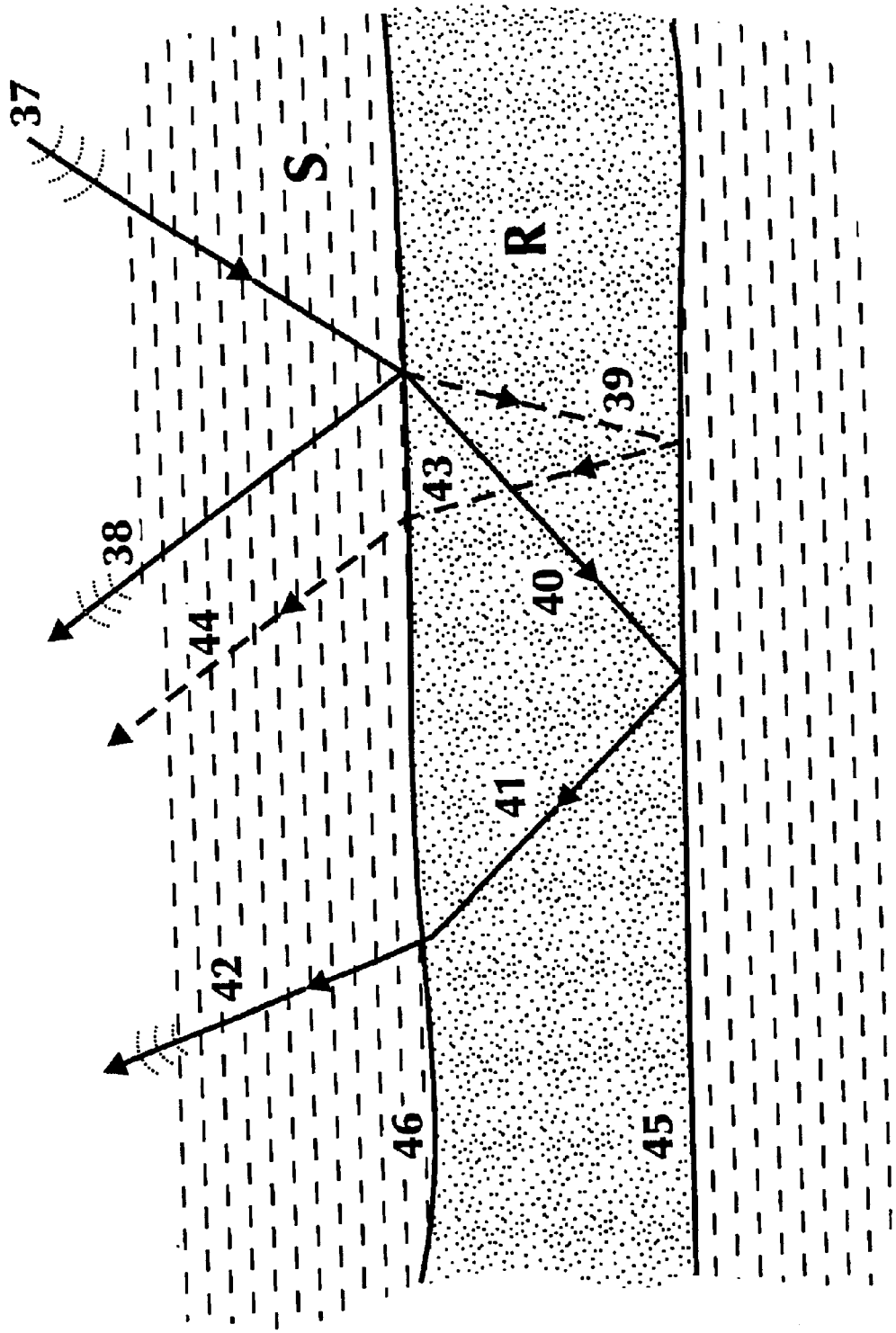
FIG. 3 displays the effects of Slow-Wave on the reflected and refracted seismic signals.

FIG. 3 illustrates the behavior of the Compressional Wave 37 as it is refracted in the reservoir rock R. The Compressional Wave 37 separates after refraction, into two waves, one is a Compressional Wave and the other is a Slow-Wave. The refracted Slow-Wave is shown as 39 and the refracted Compression Wave is shown as 40. Since the two waves, 39 and 40, Slow-Wave and Compressional Wave have different velocities in the formation R, the two waves travel at different paths as they propagate through the formation R. Although the angle of incidence is the same, the angle of refraction for the lower velocity Slow-Wave [Snell's Law] is smaller than the angle of refraction for the Compressional Wave. The path of the Compressional Wave reflected signal from the lower interface 45 of R is shown as 41 and 42, which is different than the path of the Slow-Wave reflected signal 43 and 44 from the same interface 45. Due to different velocities of Slow-Wave and Compressional Wave in the reservoir formation R, not only the refraction angles and the reflection paths from 45 are different but the time of arrival for 41 and 42 at the receivers 12 in FIG. 1, also is different than the time of arrival for 43 and 44. Using the current and conventional data processing methods, which do not realize the existence of the Slow-Wave and do not account for its lower velocity in the reservoir rocks, the reflection generated by the Slow-Wave is mapped as a 'shadow' or a 'ghost' of the Compressional Wave reflection from R. This is an artifact created by the lack of understanding of the actual behavior of the seismic wave propagation in porous and permeable reservoir formations. This invention takes into account the presence of the Slow-Wave in reservoir rocks and how its reflection and refraction properties can be effectively used as a seismic attribute for direct hydrocarbon detection.

The degree of elastic nonlinearity in different earth formations changes according to the rock properties. These changes are related to the presence of compliant features in the rock formation and its pore fluids. The porous rocks and the rocks that are fractured exhibit a higher order of elastic nonlinearity due to disorganized grains and larger pore space. Shales and clays, compared to sands, exhibit a lower order of nonlinearity since they are more homogeneous and have lower porosity. A porous and permeable rock, as shown in FIG. 2, will be elastically more nonlinear than a more homogeneous rock like shale. [Reference: Donskoy, McKee, 1977; Paul Johnson, 1977].

The level of elastic nonlinear interaction between the two seismic waves is greater in higher porosity and micro-fractured rocks. Due to this reason, new frequencies that result from the nonlinear interaction have larger amplitude in higher porosity and micro-fractured rocks compared to non-porous rocks. These new frequencies are generated by a continuous process of summing and differencing between the two frequencies of the primary signals, as the two signals propagate through nonlinear formations. The nonlinear interaction of the seismic pulse generated by source 11 in FIG. 1 results in frequency spectral broadening while this seismic signal propagates through the reservoir formation. The broadening of the frequency spectrum is caused by the initial source pulse 11, being composed of multiple discrete frequencies, which give rise to the harmonics of all the source frequencies in addition to the sum and difference of those frequencies. Due to this nonlinear interaction new frequencies are created; which extend the lower part of the spectrum all the way to the Zero Frequency and on the higher part of the spectrum to the second and third harmonics of the useable highest frequency in the initial input pulse generated by source 11.

Figure 4:
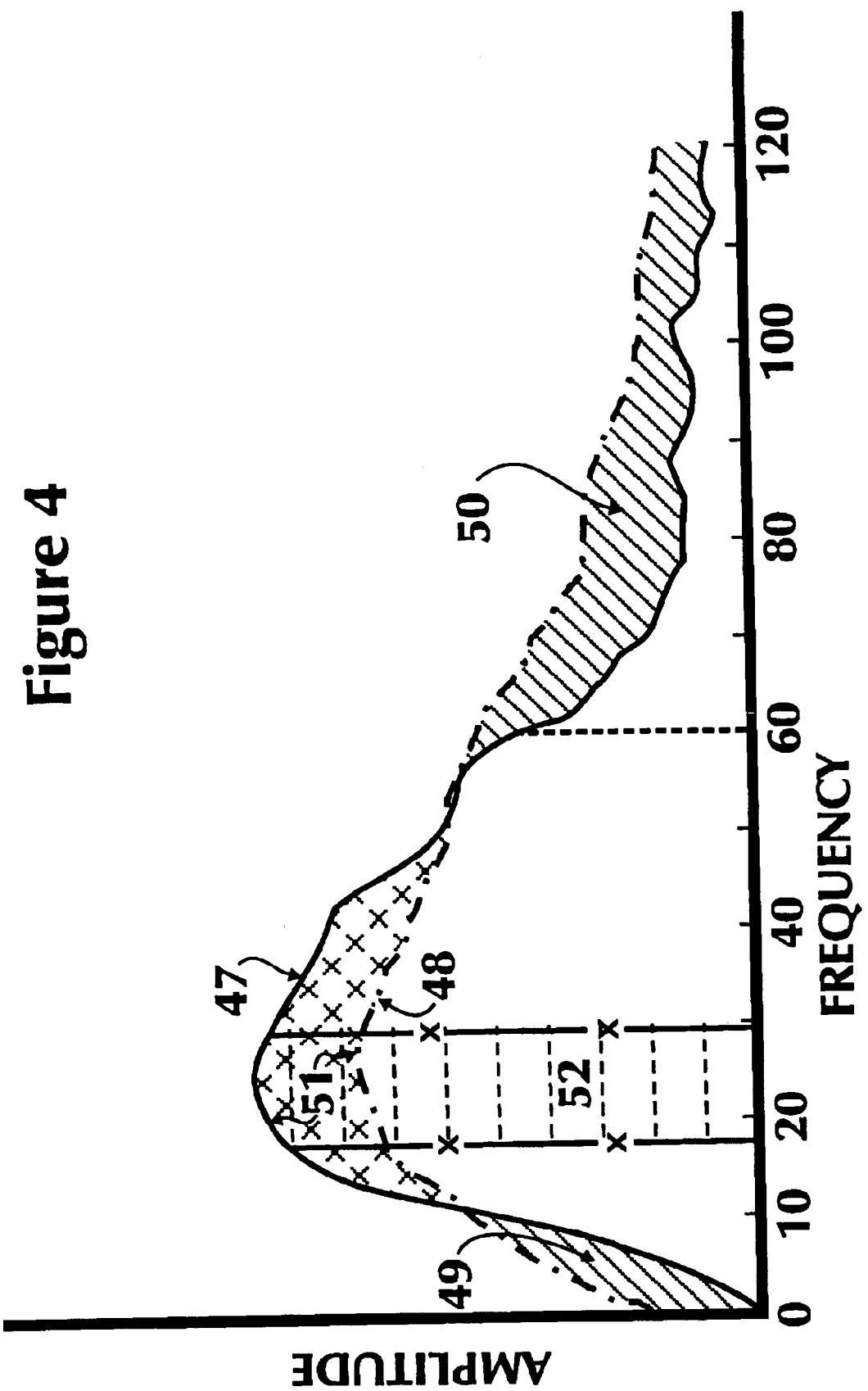
FIG. 4 is a schematic that shows the frequency spectrum broadening of the seismic pulse due to elastic nonlinearity of the reservoir rocks.

FIG. 4 is an illustration of spectral broadening of a seismic pulse due to elastic nonlinear interaction that takes place during its propagation through a porous and permeable reservoir formation. In FIG. 4, 47 displays an average value of the frequency spectrum, which corresponds to a pre-selected time or depth window of the seismic reflection data volume. The time or depth window to calculate the average spectral value is selected to cover the zone of interest, where geologically reservoir rocks are to be expected. If necessary, multiple overlapping windows can be used. The frequency spectrum 48 is the result of the frequency spectral broadening due to the seismic wave propagation in the reservoir formation R. The amplitude/frequency response of 48 will depend on the porosity, permeability and pore fluid viscosity of the reservoir formation R. The spectral characteristics of 48 depend on the nonlinear process of new frequencies being created due to nonlinearity of the reservoir rock and the attenuation of these frequencies due to absorption. The new frequencies created are shown as 49 and 50. The lower frequencies, which extend all the way to Zero Frequency, are represented by 49. The extension of the higher frequencies is shown as 50. There is a certain amount of loss in the amplitude in the mid-frequency range, as shown by 51, due to the energy lost in harmonic generation. The maximum loss 51 in the amplitude of the mid-frequencies will be a narrow band of frequencies, which coincide with the peak amplitude in 47. The narrow band of these frequencies, which have the largest amplitude difference between 47 and 48, is shown as 52. A seismic reflection image with a frequency bandwidth of 52, shown as 18 Hz to 30 Hz in this illustration, will show a relative amplitude weakening that characterizes the presence of reservoir rocks embedded in nonporous sealing rocks.

To calculate the average spectrum 47, FFT or any other similar spectral analysis method can be used. A time or depth window can be selected, which can be a few hundred milliseconds in time or a few hundred feet in depth. Fourier spectra of the individual CDP seismic signals within the selected time or depth window are calculated. An average spectrum value shown as 47 is calculated by stacking the individual spectrums of different CDP points over a selected seismic reflection data volume. If necessary, multiple time or depth windows that may overlap can be analyzed. The average spectral value 47 is compared with the individual CDP stacked spectra. In the reservoir formation, the deviation between the average and the individual spectra is going to be more prominent due to the spectral broadening. The differenced signals, which represent the residual amplitudes of the spectrum, will be identified as 49, 50 and 51. The increase in the low frequency component 49, or high frequency component 50 or both, will be indicative of the presence of elastically nonlinear rocks in the seismic reflection image that is being analyzed. Further analysis may show weakening of the reservoir-related signals 51 in the mid-frequency range 52.

In this invention, the results of spectral changes 49, 50 and 51 due to elastic nonlinearity of the reservoir formation R, are used as a seismic attribute to identify reservoir rocks and to map the spectral changes in the seismic reflection from the lower interface of the reservoir shown as 45 in Figure. 3. The spectral characteristics of the seismic reflection data from 45 identifies the presence of the hydrocarbon-bearing reservoir formation and its reservoir properties. A CDP-stacked seismic reflection display of the lower frequencies, which are identified as 49, shown as 0 Hz to 10 Hz in FIG. 4, will only display the nonlinear reservoir formations. The other sealing formations will not be visible. In the same manner, a CDP stack of higher frequencies shown as 50, shown as 60 Hz to 120 Hz in FIG. 4, will only display the nonlinear reservoir formation, and the other sealing formations will not be visible. A CDP stack of the mid-frequencies shown as 52 shown as 18 Hz to 30 Hz in FIG. 4, will display lower amplitude of the seismic reflection from the reservoir R and also weaker reflection from the acoustic impedance contrast below the reservoir shown as A in FIG. 1. These seismic reflection attributes are direct indicators of the reservoir rocks—hydrocarbon sands or porous carbonates—embedded in a sealing formation like shale.

Figure 5:
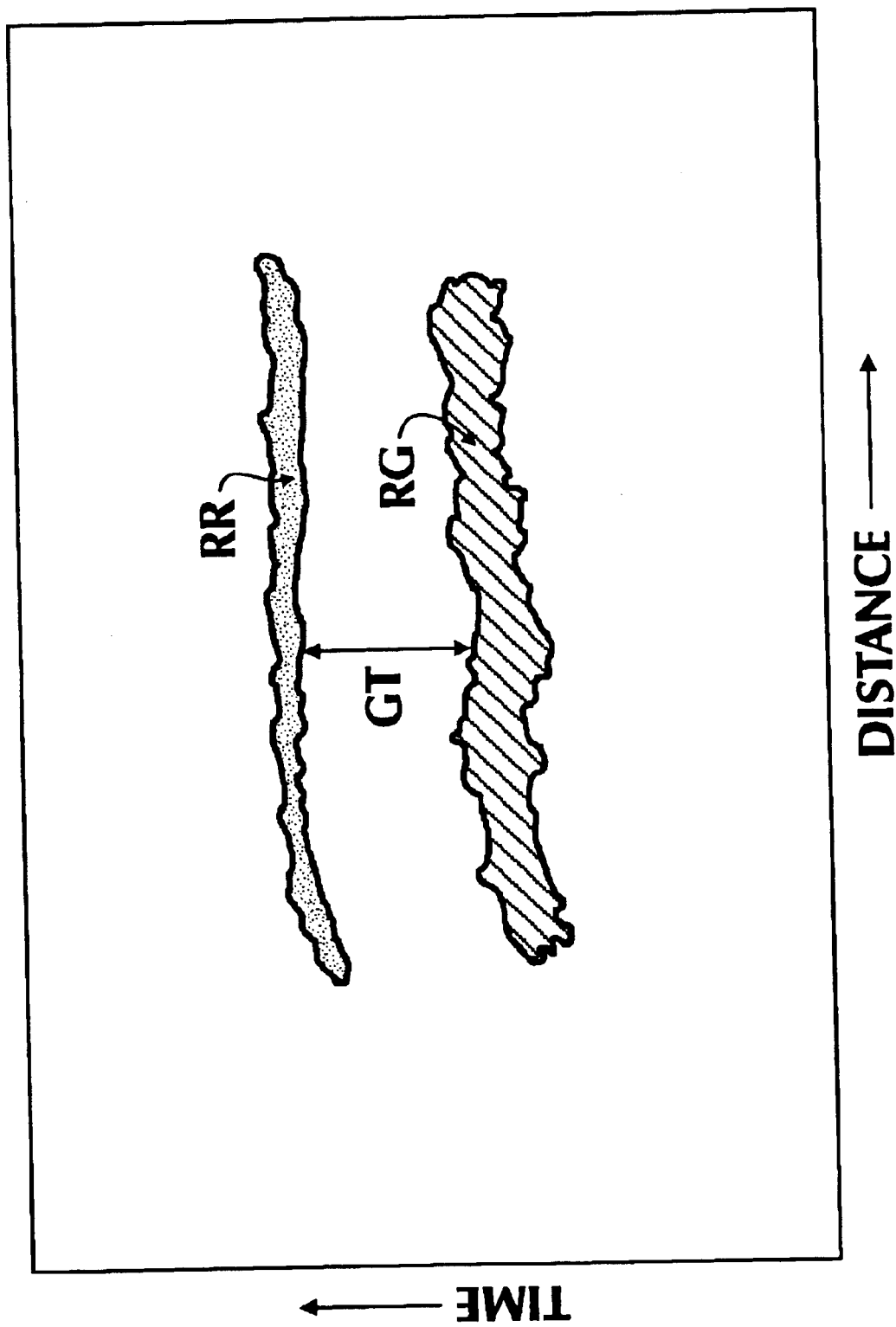
FIG. 5 displays an artifact that appears on the seismic reflection cross-sections due to Slow-Wave reflection.

FIG. 5 illustrates a CDP-stacked and low-pass filtered cross section of the seismic reflection data. It shows RR as a reflection from the reservoir formation R. The data have been low-pass frequency filtered to retain the lower frequencies of the seismic spectrum as shown by 49 in FIG. 4. Due to the presence of the Slow-Wave as shown in FIG. 3, the refracted and reflected signals 39 and 43 travel through the reservoir R on a different path than the normal Compressional Wave signals 40 and 41. In addition to traveling on a different path, the Slow-Wave velocity is considerably slower than the Compressional Wave velocity. The Slow-Wave reflection 44 is recorded at a delayed time by the recording system. Because of this delay it is incorrectly imaged as RG. One of the other main characteristics of the Slow-Wave is its diffusive nature where most of the higher frequencies are attenuated and only the low frequencies survive. When a standard data processing sequence is used, which is normal in the industry today, we get a smeared low frequency reflection RG delayed in time by GT, as shown in FIG. 5. The reflection RG is not correctly imaged because the standard velocity function used for seismic data processing sequence does not take into account the presence of the Slow-Wave, its lower velocity and its effect on the refracted and reflected signals from the reservoir formation R. Today in the industry, RG is an artifact, which cannot be easily explained and is recognized as a 'shadow' or 'ghost' of the reservoir reflection.

This invention explains the reason of this shadow RG below the reservoir reflection RR by showing that the presence of the Slow-Wave in the reservoir creates this artifact The presence of the 'shadow' artifact is an indicator that can be used as a powerful seismic attribute for mapping reservoir characteristics. The amplitude of the Slow-Wave is related to the permeability and pore fluid viscosity. A larger amplitude of the shadow RG suggests that the reservoir rock has high permeability and low viscosity pore fluids. The time delay GT between the reflection RR and the shadow RG provides us a direct means of calculating the Slow-Wave velocity in the reservoir formation RR. Once the velocity of the Slow-Wave in the reservoir formation RR is known, and the velocity of the pore fluid is established through borehole information, the tortuosity (T) of the reservoir rock can be calculated. Knowing the tortuosity of RR, its permeability can be estimated. Anyone familiar with the current technology of calculating velocities from two-way reflection times can easily calculate the Slow-Wave velocity once the delay GT in FIG. 4 is known. From the Slow-Wave velocity, the bulk tortuosity of the reservoir formation R can be calculated as:

$$V_{slow} = V_{fluid}/\sqrt{T}$$

where T is Tortuosity; and Vfluid is the compressional velocity in the pore fluid. Tortuosity is a measure of the sinuosity of the pores. Once the Tortuosity of the permeable formation has been determined, the Sinuosity of the interconnected pores can be calculated. The Tortuosity 'T' equals to:

$$T = [L_a/L_i]^2$$

Where La is the actual [sinuous] length of the interconnected pores in a formation of thickness L.

So we can simplify the equation for Vslow:

$$Vslow = Vfluid\,[L\,/La]$$

In 1960 Scheidegger showed that permeability of a solid that has porosity 'φ' containing sinuous pores of constant radius 'r' and tortuosity 'T' is given by:

$$K = \phi r^2 / 8T$$

where 'K' is the permeability of the rock. Once the bulk tortuosity of a reservoir formation has been determined, the bulk permeability can be estimated. The permeability is strongly dependent on pore size, and is also a function of the rock tortuosity.

SUMMARY OF THE INVENTION a) This invention requires that seismic data acquisition should be done with recording filters that allow lower frequencies all the way down to Zero Frequency, and higher frequencies up to the second harmonic of the highest useable frequency generated by the seismic source. It allows the new frequencies, which are being created due to the elastic nonlinearity of the reservoir formations to be recorded by 10 and 12, FIG. 1, and preserved for later data analysis. These new frequencies are not present in the frequency spectrum of the input seismic pulse generated by the seismic source 11.

b) The creation of new frequencies due to elastic nonlinearity of the reservoir rocks produces spectral broadening of the reflected seismic signal from the reservoir formation R shown as 48 in FIG. 4. In this invention, the newly created lower and higher frequencies, 49 and 50, are used to highlight and map the presence of the porous and permeable reservoir rocks R embedded in nonporous sealing formation S.

c) This invention further takes into account the presence of the Slow-Wave in the porous and permeable reservoir formation and its effect on the reflection and refraction from the upper and lower interfaces of the reservoir formation, as shown in FIG. 3.

d) Due to comparatively very low velocity of the Slow-Wave, a time-delayed reflection artifact is created when data are processed using conventional seismic data processing methods used today. This artifact, RG in FIG. 5, is misunderstood as a 'shadow' or 'ghost'. This invention describes the cause of such a 'shadow', which is a hydrocarbon indicator, and explains how the time-delay of this artifact GT can be used to calculate the velocity of the Slow-Wave. Once the velocity of the Slow-Wave is known, the tortuosity of the reservoir rock can be calculated and the permeability estimated.

e) This invention further explains the reason of the weakening of the seismic reflection when imaged using the mid-frequencies of the spectrum and weakening of the reflection directly below the reservoir.

f) In brief, this invention stresses the importance of considering the elastic nonlinearity effects of the reservoir rocks and the existence of a Slow-Wave in porous and permeable formations. It explains how these nonlinear effects can be used as direct hydrocarbon indicators for exploration work.

What is claimed is:

1. A new method of mapping the reservoir rocks, using seismic reflection recording and measuring the effects of the rock's elastic nonlinearity on the seismic reflected signals due to the rock's porosity, fracturing, heterogeneity and pore fluids and distinguishing these reservoir rocks from the rocks that are relatively linear due to lack of porosity, homogeneous rock structure and lower fluid content, such method comprising (a) through (j) below:

(a) recording seismic reflection data using an impulsive energy source and receivers in a conventional 2-D or 3-D configuration;

(b) using seismic detectors, digitizers and other ancillary equipment to record the seismic data with a broad frequency bandwidth, which covers lower frequencies down to Zero Frequency and higher frequencies up to twice the highest useable frequency generated by the seismic source;

(c) preserving the true relative amplitude of the new frequencies, which are created in the subsurface reservoir formation due to elastic nonlinearity of the reservoir rocks;

(d) selecting a time or depth window in the seismic reflection data volume to cover the zone of investigation for locating the reservoir rocks embedded in the sealing formations;

(e) analyzing the spectral characteristics of the subsurface seismic reflection data in the selected time or depth window to monitor the frequency spectral broadening due to porosity and permeability of the reservoir rocks;

(f) spectral differencing used to identify spectral broadening effects of the individual CDP locations, individual spectral differences measured against the average summed spectra calculated over the selected time or depth window for a larger seismic reflection data volume under investigation;

(g) designing Low-Pass and High-Pass filters based on the spectral differencing results, the filters designed to allow the new higher and lower frequencies created due to nonlinearity of the reservoir rocks and attenuating the frequencies generated by the input source pulse;

(h) applying these Low-Pass and High-Pass filters to the seismic reflection 2-D or 3-D seismic data volume, and displaying the filtered data, which contains only the new frequencies created in the seismic reflection data due to reservoir rock nonlinearity;

(i) interpreting the filtered displays of the seismic reflection data volume to identify the presence of the reservoir rocks embedded in the sealing formations, interpretation based on the presence of the lower and higher frequencies created due to reservoir nonlinearity which were not present in the seismic source input pulse;

(j) mapping the extent and location of the reservoir rocks using the filtered data integrated with the conventional unfiltered data.

2. A new method of locating and confirming the presence of the porous and permeable reservoir rocks embedded in the sealing formations by using the low-pass frequency filtered seismic reflection data, by identifying the changes that are caused in the amplitude and phase of the reflection data by the presence of the Slow-Wave, which exists in the porous and permeable reservoir formation, and calculating the Slow-Wave velocity and the tortuosity of the reservoir rock, then deriving the reservoir rock's permeability, such method comprising (a) through (f):

(a) analyzing the relative amplitudes, locations and the extent of the reflections in the 2-D or 3-D seismic reflection data volume, which has been low-pass frequency filtered;

(b) identifying the seismic reflection, which represents the reservoir formation and locating any anomalous artifact, which is related to that particular reflection, appearing as a time-delayed event;

(c) based on the measured time delay between the artifact and the reflection that caused it, calculate the velocity of the Slow-Wave;

(d) perform velocity analysis using CDP reflection data to confirm and refine the Slow-Wave velocity derived earlier;

(e) based on the Slow-Wave velocity and the velocity of the pore fluids derived from wellbore information, calculate the reservoir rock's tortuosity;

(f) estimate the reservoir rock permeability based on the calculated tortuosity and the borehole information providing porosity, grain size and pore structure.

* * * * *